United States Patent [19]
Iue et al.

[11] Patent Number: 5,717,415
[45] Date of Patent: Feb. 10, 1998

[54] DISPLAY SYSTEM WITH 2D/3D IMAGE CONVERSION WHERE LEFT AND RIGHT EYE IMAGES HAVE A DELAY AND LUMINANCE DIFFERENCE BASE UPON A HORIZONTAL COMPONENT OF A MOTION VECTOR

[75] Inventors: Satoshi Iue, Ashiya; Haruhiko Murata, Takatsuki; Yukio Mori, Yawata; Toshiya Iinuma; Akihiro Maenaka, both of Moriguchi; Takahisa Ando, Kadoma; Daisuke Takemori, Suita; Shigekazu Minechika, Kishiwada, all of Japan

[73] Assignee: Sanyo Electric Co., Ltd., Osaka, Japan

[21] Appl. No.: 677,787

[22] Filed: Jul. 10, 1996

Related U.S. Application Data

[63] Continuation of Ser. No. 380,753, Jan. 31, 1995, abandoned.

[30] Foreign Application Priority Data

| Feb. 10, 1994 | [JP] | Japan | 6-010583 |
| Feb. 16, 1994 | [JP] | Japan | 6-018582 |
| Sep. 22, 1994 | [JP] | Japan | 6-228209 |
| Feb. 24, 1996 | [JP] | Japan | 6-026796 |

[51] Int. Cl.$^6$ .................................................. G09G 5/00
[52] U.S. Cl. .................................. 345/8; 345/139; 348/416
[58] Field of Search ........................... 345/8–9, 135, 345/139; 395/119, 127; 348/42, 46, 51, 416, 401, 405, 413, 699, 701; 364/565; 359/458

[56] References Cited

U.S. PATENT DOCUMENTS

| 3,674,921 | 7/1972 | Goldsmith | 348/43 |
| 4,160,973 | 7/1979 | Berlin, Jr. | 348/51 |
| 4,264,926 | 4/1981 | Etra | 348/43 |
| 4,480,263 | 10/1984 | van Merode | 358/3 |
| 4,630,097 | 12/1986 | Marks | 348/51 |
| 4,651,206 | 3/1987 | Ohki | 348/416 |
| 4,754,327 | 6/1988 | Lippert | 358/88 |
| 4,791,581 | 12/1988 | Ohba | 364/521 |
| 4,807,024 | 2/1989 | McLaurin et al. | |
| 4,896,210 | 1/1990 | Brokenshire et al. | 348/51 |
| 5,089,888 | 2/1992 | Zdepski et al. | 348/405 |
| 5,090,038 | 2/1992 | Asahina | |
| 5,177,608 | 1/1993 | Ohki et al. | 348/416 |
| 5,245,319 | 9/1993 | Kilian | 345/9 |
| 5,281,960 | 1/1994 | Dwyer, III | 345/8 |
| 5,315,377 | 5/1994 | Isono et al. | 345/139 |
| 5,361,100 | 11/1994 | Teece | 345/139 |
| 5,510,832 | 4/1996 | Garcia | 348/42 |

FOREIGN PATENT DOCUMENTS

| 2654291 | 5/1991 | France |
| 60-263594 | 12/1985 | Japan |
| 64-7793 | 1/1989 | Japan |
| 2180719 | 4/1987 | United Kingdom |
| 9208156 | 5/1992 | WIPO |

OTHER PUBLICATIONS

Patent Abstracts of Japan, vol. 007 No. 140 (E-182), 18 Jun. 1983 & JP-A-58 054796 (Nippon Victor KK) 31 Mar. 1983.

*Primary Examiner*—Mark R. Powell
*Assistant Examiner*—Martin Loui
*Attorney, Agent, or Firm*—Nikaido, Marmelstein, Murray & Oram LLP

[57] ABSTRACT

The present invention relates to a method of converting two-dimensional images into three-dimensional images. In the present invention, a right eye image signal and a left eye image signal between which there is relatively a time difference or a luminance difference are produced from a two-dimensional image signal, thereby to convert two-dimensional images into three-dimensional images. According to the present invention, therefore, it is possible to convert the existing two-dimensional image software into pseudo three-dimensional image software to obtain three-dimensional images.

19 Claims, 13 Drawing Sheets

| Figure | Signal | | | | | | | | | | |
|---|---|---|---|---|---|---|---|---|---|---|---|
| FIG.5A | LUMINANCE SIGNAL Y IN CURRENT FIELD | O1 | E1 | O2 | E2 | O3 | E3 | O4 | E4 | O5 | E5 | O6 | E6 | O7 | E7 | O8 | E8 | O9 | E9 |
| FIG.5B | DELAY | 0 | 0 | 1 | 1 | 2 | 2 | 3 | 3 | 4 | 4 | 4 | 4 | 3 | 3 | 2 | 2 | 1 | 1 |
| FIG.5C | DATA STORED IN MO1 | ... | O1 | ... | ... | ... | ... | ... | O4 | ... | ... | ... | ... | ... | O7 | ... | ... | ... | ... |
| FIG.5D | DATA STORED IN ME1 | ... | ... | ... | E1 | ... | ... | ... | ... | ... | E4 | ... | ... | ... | ... | ... | E7 | ... | ... |
| FIG.5E | DATA STORED IN MO2 | ... | ... | ... | O2 | ... | ... | ... | ... | ... | O5 | ... | ... | ... | ... | ... | O8 | ... | ... |
| FIG.5F | DATA STORED IN ME2 | ... | ... | ... | ... | ... | E2 | ... | ... | ... | ... | ... | E5 | ... | ... | ... | ... | ... | E8 |
| FIG.5G | DATA STORED IN MO3 | ... | ... | ... | ... | ... | O3 | ... | ... | ... | ... | ... | O6 | ... | ... | ... | ... | ... | O9 |
| FIG.5H | DATA STORED IN ME3 | ... | ... | ... | ... | ... | ... | ... | E3 | ... | ... | ... | ... | ... | E6 | ... | ... | ... | ... |
| FIG.5I | OUTPUT YO OF FIELD MEMORY | ☒ | ☒ | O2 | O2 | ☒ | ☒ | O3 | O3 | ☒ | ☒ | O4 | O4 | ☒ | ☒ | O6 | O7 | ☒ | O9 |
| FIG.5J | OUTPUT YE OF FIELD MEMORY | ☒ | E1 | ☒ | E2 | E2 | ☒ | ☒ | E3 | E3 | ☒ | ☒ | E4 | E5 | ☒ | ☒ | E7 | E8 | ☒ |
| FIG.5K | OUTPUT OF SELECTOR S2 | Y | Y | YE | YO | YE | YO | YO | YE | YO | YE | YE | YO | YO | YE | YO | YE | YE | YO |
| FIG.5L | INTERPOLATION COEFFICIENT K | 1 | 1 | 0.5 | 0.5 | 1 | 1 | 0.5 | 0.5 | 1 | 1 | 1 | 1 | 0.5 | 0.5 | 1 | 1 | 0.5 | 0.5 |
| FIG.5M | OUTPUT OF INTERPOLATION CIRCUIT 334 | O1 | E1 | O2 | E2 | O3 | E3 | O4 | E4 | O5 | E5 | O6 | E6 | O7 | E7 | O8 | E8 | O9 | E9 |

| FIG. 6A | LUMINANCE SIGNAL Y IN CURRENT FIELD | O1 | E1 | O2 | E2 | O3 | E3 | O4 | E4 | O5 | E5 | O6 | E6 | O7 | E7 | O8 | E8 | O9 | E9 |
|---|---|---|---|---|---|---|---|---|---|---|---|---|---|---|---|---|---|---|---|
| FIG. 6B | DELAY | 0 | 0 | 1 | 1 | 2 | 2 | 3 | 3 | 4 | 4 | 4 | 4 | 3 | 3 | 2 | 2 | 1 | 1 |
| FIG. 6C | OUTPUT YO OF FIELD MEMORY | ✗ | ✗ | O2 | O2 | O3 | O3 | O3 | ✗ | O4 | ✗ | O5 | O6 | O7 | ✗ | O8 | O9 |
| FIG. 6D | OUTPUT YE OF FIELD MEMORY | ✗ | E1 | ✗ | E2 | E2 | ✗ | E3 | E3 | ✗ | E4 | E5 | ✗ | E6 | E7 | E8 | ✗ |
| FIG. 6E | OUTPUT OF SELECTOR S2 | Y | Y | YO | YO | YE | YE | YO | YO | YE | YE | YO | YO | YE | YE | YO | YO |
| FIG. 6F | OUTPUT OF SELECTOR S5 | ✗ | YE | LM | YE | ✗ | YO | LM | YE | ✗ | ✗ | ✗ | YO | LM | YE | ✗ | YO | LM |
| FIG. 6G | INTERPOLATION COEFFICIENT K | 1 | 1 | 0.5 | 0.5 | 0.5 | 1 | 0.5 | 0.5 | 0.5 | 1 | 1 | 1 | 0.5 | 0.5 | 0.5 | 1 | 0.5 | 0.5 |
| FIG. 6H | OUTPUT OF INTERPOLATION CIRCUIT 334 | O1 | E1 | O2 O2 | E2 O3 | O3 E3 | E3 | O4 E4 | E4 O5 | O5 E5 | E5 O6 | O6 E6 | E6 O7 | E7 O8 | O8 | E8 O9 |

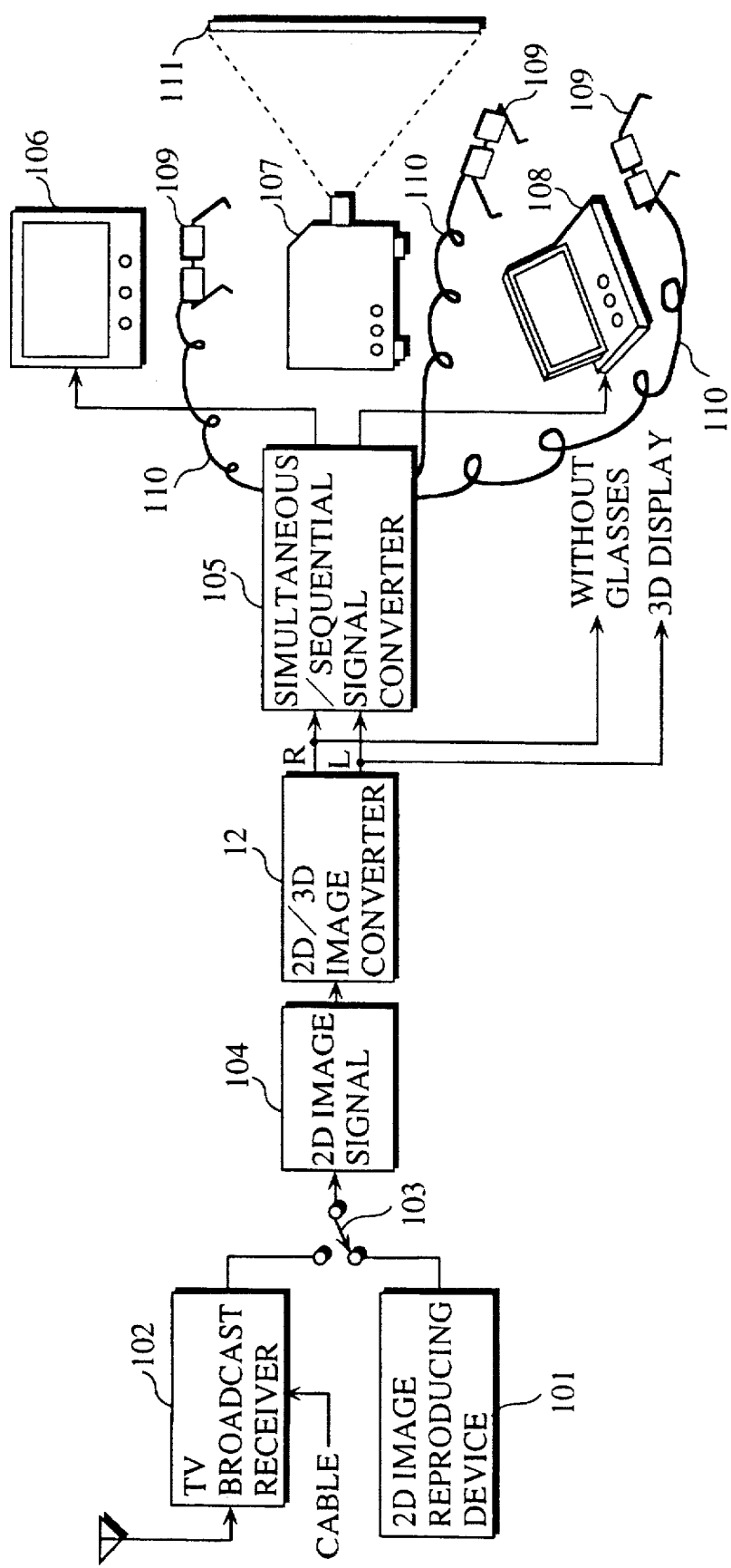

ODD FIELD(RIGHT EYE IMAGE)

EVEN FIELD(LEFT EYE IMAGE)

DISPLAY SYSTEM WITH 2D/3D IMAGE CONVERSION WHERE LEFT AND RIGHT EYE IMAGES HAVE A DELAY AND LUMINANCE DIFFERENCE BASE UPON A HORIZONTAL COMPONENT OF A MOTION VECTOR

This application is a continuation of application Ser. No. 08/380,753 filed Jan 31, 1995 is now abandoned.

BACKGROUND OF THE INVENTION

1. Field of the Invention

The present invention relates to a method of converting two-dimensional (2D) images into three-dimensional (3D) images and a 3D image display system for obtaining 3D images from 2D images.

2. Description of the Prior Art

In order to obtain 3D images having binocular parallax, it is necessary to record a 3D image signal on right and left two channels obtained by imaging using a dedicated 3D imaging device having two cameras, reproduce the signal, and display the signal on a dedicated 3D display or the like.

According to this method, therefore, 3D images cannot be obtained from the existing 2D image software. Consequently, 3D image software must be newly produced in order to obtain 3D images having the same content as that of the existing 2D image software.

SUMMARY OF THE INVENTION

An object of the present invention is to provide a method of converting 2D images into 3D images in which the existing 2D image software can be converted into pseudo 3D image software.

Another object of the present invention is to provide a 3D image display system capable of obtaining 3D images from 2D images.

A first method of converting 2D images into 3D images according to the present invention is characterized in that a right eye image signal and a left eye image signal between which there is relatively a time difference are produced from a 2D image signal, thereby to convert 2D images into 3D images.

The 2D image signal is obtained by reproducing 2D image software stored in a record medium by image reproducing means. Further, the 2D image signal is outputted in real time from imaging means, CG (Computer Graphics) producing means or the like.

An image represented by the 2D image signal includes a moving portion, and the time difference is controlled on the basis of the speed of the movement in the moving portion.

A second method of converting 2D images into 3D images according to the present invention is characterized in that a first image signal which forms the basis and a second image signal which is delayed from the first image signal are produced from a 2D image signal, and one of the image signals is taken as a left eye image signal and the other image signal is taken as a right eye image signal, thereby to convert 2D images into 3D images.

An image represented by the 2D image signal includes a moving portion, and delay indicating how many fields are there from a field corresponding to the first image signal to a field corresponding to the second image signal is determined on the basis of the speed of the movement in the moving portion. That is, the higher the speed of the movement in the moving portion is, the smaller the delay is, while the lower the speed of the movement in the moving portion is, the larger the delay is.

The second image signal is obtained by storing the 2D image signal in a memory once and reading out from the 2D image signal stored in the memory a 2D image signal corresponding to the delay determined on the basis of the speed of the movement in the moving portion.

It is determined on the basis of the direction of the movement in the moving portion which of the first image signal and the second image signal is taken as each of the left eye image signal and the right eye image signal. That is, if the direction of the movement in the moving portion is a direction from the left to the right, the first image signal is taken as the left eye image signal and the second image signal is taken as the right eye image signal. On the other hand, if the direction of the movement in the moving portion is a direction from the right to the left, the first image signal is taken as the right eye image signal and the second image signal is taken as the left eye image signal.

When the first image signal and the second image signal corresponding thereto differ in the type of field, that is, one of the signals is in an odd field and the other signal is in an even field, it is preferable that either one of the first image signal and the second image signal is subjected to infield interpolation processing in order to make the image signals equal in the type of field.

In a field where the delay has been just changed, it is preferable that the second image signal is subjected to interfield interpolation processing in order to obtain a smoothly moving signal.

A third method of converting 2D images into 3D images is characterized in that a right eye image signal and a left eye image signal between which there is relatively a luminance difference are produced from a 2D image signal, thereby to convert 2D images into 3D images.

An image represented by the 2D image signal includes a moving portion, and the luminance difference is controlled on the basis of the speed of the movement in the moving portion.

A fourth method of converting 2D images into 3D images is characterized in that a first image signal which forms the basis and a second image signal the luminance of which is attenuated from the first image signal are produced from a 2D image signal, and one of the signals is taken as a left eye image signal and the other signal is taken as a right eye image signal, thereby to convert 2D images into 3D images.

An image represented by the 2D image signal includes a moving portion, and the amount of attenuation of the luminance of the second image signal from the first image signal is determined on the basis of the speed of the movement in the moving portion. That is, the higher the speed of the movement in the moving portion is, the smaller the amount of attenuation of the luminance is, while the lower the speed of the movement in the moving portion is, the larger the amount of attenuation of the luminance is.

The second image signal is obtained by attenuating the luminance of the 2D image signal by variable luminance adjusting means such as an attenuator depending on the amount of attenuation of the luminance determined on the basis of the speed of the movement in the moving portion.

A first 3D image display system according to the present invention is characterized by comprising a 2D/3D image converter for converting 2D images into 3D images by producing from a 2D image signal a right eye image signal and a left eye image signal between which there is relatively a time difference and a display for realizing 3D images on the basis of the right eye image signal and the left eye image signal which are obtained by the 2D/3D image converter.

A second 3D image display system according to the present invention is characterized by comprising a 2D/3D image converter for converting 2D images into 3D images by producing from a 2D image signal a right eye image signal and a left eye image signal between which there is relatively a luminance difference and a display for realizing 3D images on the basis of the right eye image signal and the left eye image signal which are obtained by the 2D/3D image converter.

Examples of the display include one comprising a 3D image display monitor for simultaneously displaying the right eye image signal and the left eye image signal which are obtained by the 2D/3D image converter.

Examples of the display include one comprising a 2D image display monitor for alternately switching the right eye image signal and the left eye image signal which are obtained by the 2D/3D image converter for each predetermined number of fields or frames and displaying the signal obtained by the switching and 3D image viewing glasses having a left eye portion and a right eye portion which can be so switched that one of the portions enters a light transmitted state and the other portion enters a light intercepted state. In this case, the left eye portion and the right eye portion of the 3D image viewing glasses are so switched that one, which corresponds to an image displayed on the monitor, of the left eye portion and the right eye portion enters the light transmitted state in synchronism with the switching between the right eye image signal and the left eye image signal.

Examples of the display include one comprising a 2D image display projector for alternately switching the right eye image signal and the left eye image signal which are obtained by the 2D/3D image converter for each predetermined number of fields or frames and projecting the signal obtained by the switching and 3D image viewing glasses having a left eye portion and a right eye portion which can be so switched that one of the portions enters a light transmitted state and the other portion enters a light intercepted state. In this case, the left eye portion and the right eye portion of the 3D image viewing glasses are so switched that one, which corresponds to an image projected by the projector, of the left eye portion and the right eye portion enters the light transmitted state in synchronism with the switching between the right eye image signal and the left eye image signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1a–1e are schematic views showing the basic idea of a method of converting 2D images into 3D images according to the present invention;

FIG. 5 is a timing chart showing signals in respective portions of the 2D/3D image converter in a first normal mode;

FIG. 6 is a timing chart showing signals in respective portions of the 2D/3D image converter in a second normal mode;

FIG. 11 is a block diagram showing a still further example of the 2D/3D image conversion system;

DETAILED DESCRIPTION OF THE PREFERRED EMBODIMENTS

Figure 1A:
Figure 1B:
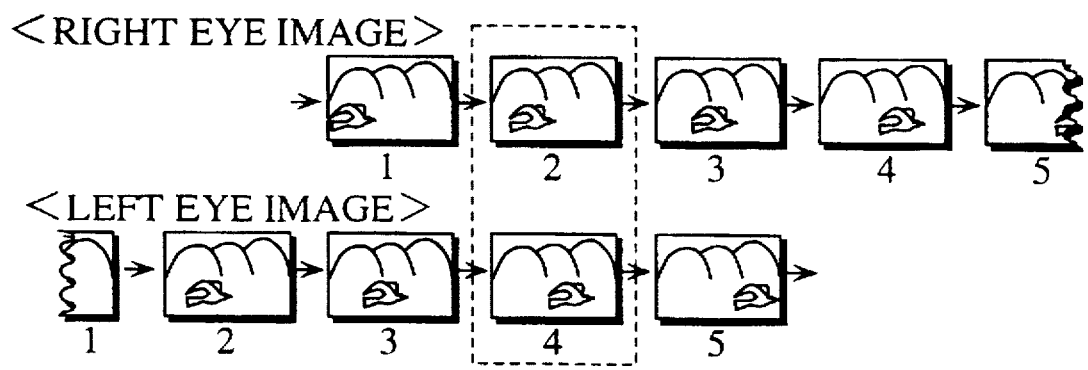
Figure 1C:
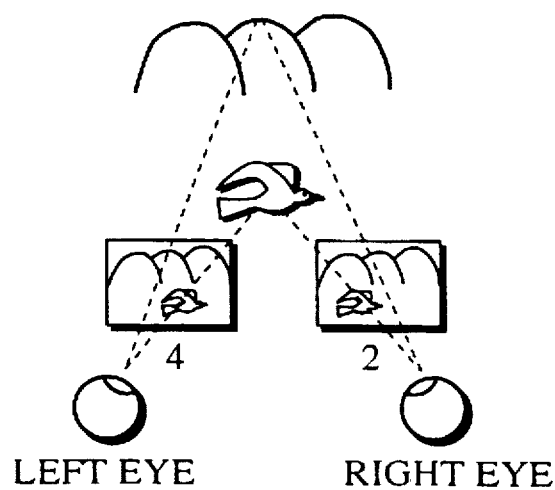

Description is now made of the basic idea of the present invention. Suppose an image scene where the background does not change and an object moves from the left to the right, as shown in FIG. 1a. If a right eye image and a left eye image between which a predetermined time difference is provided are produced, as shown in FIG. 1b, the position of the object differs by the amount of the movement of the object between the right eye image and the left eye image. Consequently, the difference in the position of the object between the right eye image and the left eye image becomes parallax, thereby to make it possible to view 3D images. Numerals in FIGS. 1b and 1c represent field numbers.

If one of the left eye image and the right eye image is delayed by one to several fields from the other image in reproducing the left eye image and the right eye image from 2D image software, the original 2D image software can be converted into 3D image software comprising a right eye image and a left eye image between which there is parallax.

Figure 2:
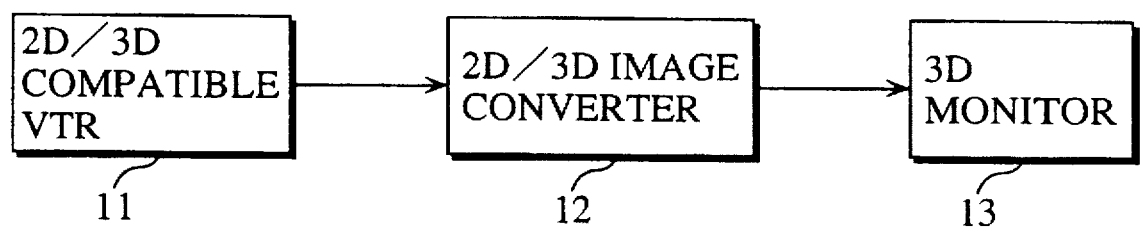
FIG. 2 is a block diagram showing the entire construction of a 2D/3D image conversion system.

FIG. 2 illustrates the construction of a 3D image software conversion system utilizing the 2D/3D converting method according to the present invention.

A 2D/3D compatible VTR 11 has a function of reproducing 2D image software and a function of reproducing 3D image software. The 2D image software reproduced by the 2D/3D compatible VTR 11 is converted into pseudo 3D image software by a 2D/3D image converter 12, after which the 3D image software is supplied to a 3D monitor 13. If a display without glasses by a lenticular method as disclosed in Japanese Patent Laid-Open No. 65943/1991 is used as the 3D monitor 13, it is possible to reproduce from 2D images pseudo 3D images partially having a 3D effect. A VTR having a function of reproducing only 2D image software may be used in place of the 2D/3D compatible VTR 11.

Figure 3:
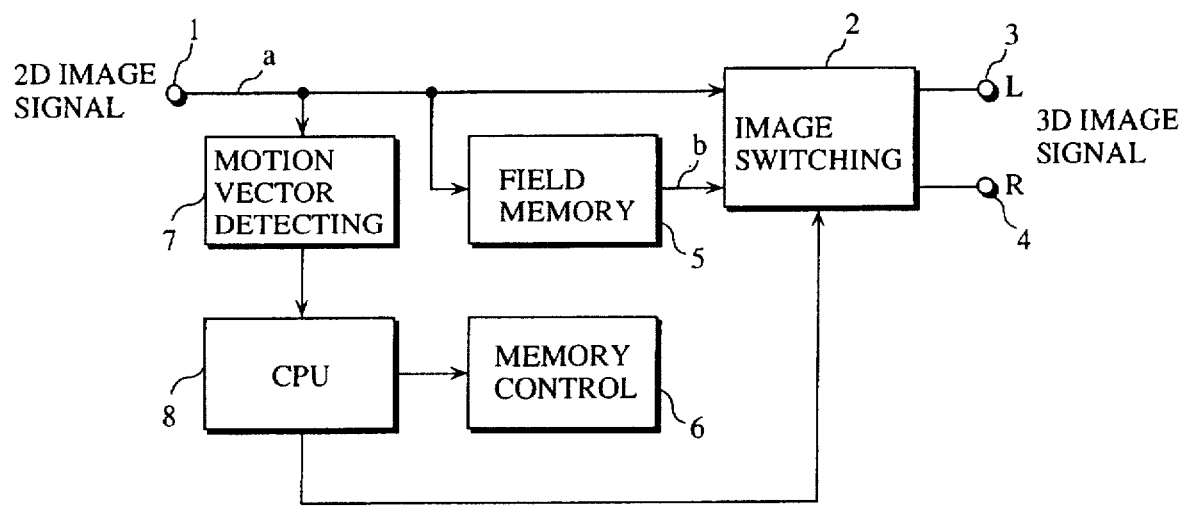
FIG. 3 is a schematic block diagram showing the construction of a 2D/3D image converter.

FIG. 3 illustrates the schematic construction of the 2D/3D image converter 12 shown in FIG. 2.

A 2D image signal a is inputted to an input terminal 1. The 2D image signal a is sent to a first input terminal of an image switching circuit 2, a motion vector detecting circuit 7 and a group of field memories 5.

The group of field memories 5 is provided so as to delay the 2D image signal a and output the delayed signal. An output of the group of field memories 5 (a delayed 2D image signal b) is supplied to a second input terminal of the image switching circuit 2. The image switching circuit 2 switches the 2D image signal a and the delayed 2D image signal b depending on the direction of the movement of an object and outputs the signal obtained by the switching to an output terminal 3 from which a left eye image signal L is outputted and an output terminal 4 from which a right eye image signal R is outputted. Delay (which indicates how many fields are there from a field corresponding to the 2D image signal a to a field corresponding to the delayed 2D image signal b) is variably controlled for each field in the range of 0 to a maximum of 60 (approximately 1 second in NTSC (National Television System Committee)). The variable unit may be a small unit of not more than one field. If the delay is zero, the 2D image signal a is sent to both the output terminals 3 and 4.

The motion vector detecting circuit 7 detects a motion vector corresponding to the movement of the object between fields on the basis of the 2D image signal a. The detected motion vector is supplied to a CPU (Central Processing Unit) 8.

The CPU 8 controls a memory control circuit 6 and the image switching circuit 2. The CPU 8 extracts a horizontal component of the motion vector detected by the motion vector detecting circuit 7 and determines the delay depending on the horizontal component. The CPU 8 controls the memory control circuit 6 so that the 2D image signal corresponding to the determined delay is read out of the group of field memories 5.

Specifically, if the movement of the object is large or the motion vector is large, the delay is so determined as to be decreased. On the other hand, if the movement of the object is small or the motion vector is small as at the time of slow-motion reproduction, the delay is so determined as to be increased.

In this example, the maximum value of the delay is 60. This corresponds to one second in the NTSC, which can almost correspond to a normal image scene. In the case of lower-speed slow-motion reproduction, however, the maximum value of the delay may be not less than 60. Further, in the case of very low-speed slow-motion reproduction, the delay may be approximately several 100.

The CPU 8 controls the image switching circuit 2 on the basis of the direction of the motion vector. That is, if the direction of the motion vector is from the left to the right, the 2D image signal a is sent to the output terminal 3 from which the left eye image signal is outputted, and the delayed 2D image signal b is sent to the output terminal 4 from which the right eye image signal is outputted. If the direction of the motion vector is from the right to the left, the 2D image signal a is sent to the output terminal 4 from which the right eye image signal is outputted, and the delayed 2D image signal b is sent to the output terminal 3 from which the left eye image signal is outputted.

As described in the foregoing, in the 2D/3D image converter 12, two image signals between which there is parallax corresponding to the speed of the movement are produced in a scene where the object moves in the horizontal direction in the 2D image signal.

The left and right image signals from the output terminals 3 and 4 are supplied to the 3D display without glasses by a lenticular method as disclosed in Japanese Patent Laid-Open No. 65943/1991, for example, thereby to reproduce pseudo 3D images partially having a 3D effect.

Figure 4:
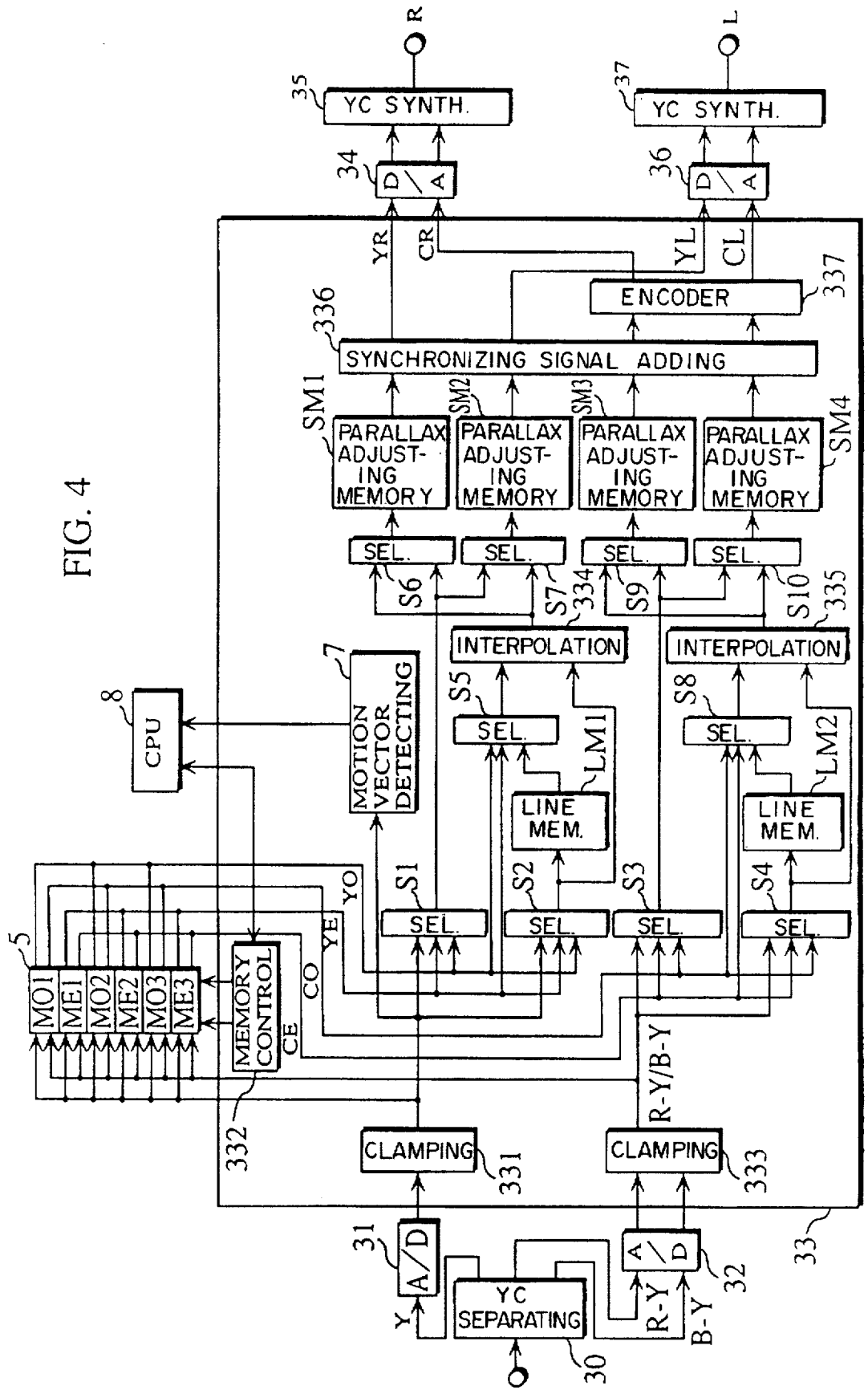
FIG. 4 is a block diagram showing the detailed construction of the 2D/3D image converter.

FIG. 4 illustrates a concrete example of a case where the above described 2D/3D image converter is integrated into an LSI.

The 2D image signal a is first separated into a luminance signal Y and color difference signals R-Y and B-Y by a YC separating circuit 30. The luminance signal Y is converted into a digital signal by an analog-to-digital (A/D) converting circuit 31. Each of the color difference signals R-Y and B-Y is converted into a digital signal by an A/D converting circuit 32. The luminance signal and the color difference signals which are digital signals obtained by the A/D conversion are inputted to an LSI for 2D/3D conversion 33.

The luminance signal Y inputted to the LSI 33 is clamped by a clamping circuit 331, after which the clamped luminance signal Y is supplied to first input terminals of a first selector S1 and a second selector S2, a motion vector detecting circuit 7 and a group of field memories 5 externally provided.

The group of field memories 5 comprises three field memories MO1 to MO3 into which data in odd fields are written and three field memories ME1 to ME3 into which data in even fields are written. The six field memories MO1 to MO3 and ME1 to ME3 are connected in parallel. The writing and reading to and from the field memories are controlled by a memory control circuit 332.

The motion vector detected by the motion vector detecting circuit 7 is supplied to a CPU 8. The CPU 8 determines suitable delay on the basis of the horizontal component of the motion vector, and controls the memory control circuit 332 on the basis of the determined delay.

The respective color difference signals R-Y and B-Y which are inputted to the LSI 33 are clamped by a clamping circuit 333 and are converted into a dot sequential signal R-Y/B-Y in which the color difference signals R-Y and B-Y alternately appear in a cycle of dots. The dot sequential signal (color difference signal) R-Y/B-Y is supplied to first input terminals of a third selector S3 and a fourth selector S4 as well as the group of field memories 5.

Data composed of a total of 12 bits which comprises a 8-bit luminance signal Y and a 4-bit color difference signal R-Y/B-Y is supplied to each of the field memories MO1 to MO3 and ME1 to ME3.

Luminance signals YO respectively outputted from the field memories MO1 to MO3 are inputted to third input terminals of the first selector S1 and the second selector S2 and a first input terminal of a fifth selector S5. Luminance signals YE respectively outputted from the field memories ME1 to ME3 are inputted to second input terminals of the first selector S1 and the second selector S2 and a second input terminal of the fifth selector S5.

Furthermore, color difference signals CO respectively outputted from the field memories MO1 to MO 3 are inputted to third input terminals of the third selector S3 and the fourth selector S4 and a first input terminal of an eighth selector. Color difference signals CE respectively outputted from the field memories ME1 to ME3 are inputted to second input terminals of the third selector S3 and the fourth selector S4 and a second input terminal of the eighth selector.

The luminance signal Y, YO or YE outputted from the second selector S2 is supplied to a line memory LM1 and an interpolation circuit 334. The luminance signal Y, YO or YE delayed for one horizontal scanning period in the line memory LM1 is inputted to a third input terminal of the fifth selector S5. An output of the fifth selector S5 is supplied to the interpolation circuit 334.

The interpolation circuit 334 comprises a coefficient unit (not shown) to which the output of the fifth selector S5 is inputted, a coefficient unit (not shown) to which the output of the second selector S2 is inputted and a first adder (not shown) for adding outputs of the coefficient units.

In the coefficient unit to which the output of the second selector S2 is inputted, the output of the second selector S2 is multiplexed by an interpolation coefficient K. In the coefficient unit to which the output of the fifth selector S5 is inputted, the output of the fifth selector S5 is multiplexed by an interpolation coefficient (1-K).

An output of the interpolation circuit 334 is supplied to a sixth selector for a right eye S6 and a seventh selector for a left eye S7. Similarly, an output of the first selector S1 is also supplied to the sixth selector for a right eye S6 and the seventh selector for a left eye S7. An output of the sixth selector S6 is supplied to a first parallax adjusting memory for a right eye SM1, and an output of the seventh selector S7 is supplied to a second parallax adjusting memory for a left eye SM2.

The parallax adjusting memories SM1 and SM2 adjust the position for reading in the horizontal direction in the range of ±48 pixels independently on the right and left sides, whereby the parallax is adjusted to adjust a 3D effect.

The construction of circuits for processing a color difference signal in a stage succeeding the third selector S3 and the fourth selector S4 is the same as the construction of the above described circuits for processing a luminance signal. Specifically, a line memory LM2, an eighth selector S8, an interpolation circuit 335, a ninth selector S9, a tenth selector S10, a third parallax adjusting memory SM3 and a fourth parallax adjusting memory SM4 respectively correspond to the line memory LM1, the fifth selector S5, the interpolation circuit 334, the sixth selector S6, the seventh selector S7, the first parallax adjusting memory SM1 and the second parallax adjusting memory SM2 as described above.

A luminance signal outputted from the first parallax adjusting memory SM1 becomes a right eye luminance signal YR after a synchronizing signal is added thereto by a synchronizing signal adding circuit 336, and the right eye luminance signal YR is sent to a digital-to-analog (D/A) converting circuit 34. Further, a color difference signal outputted from the third parallax adjusting memory SM3 is converted into a right eye chrominance signal CR by an encoder 337 after a synchronizing signal is added thereto by the synchronizing signal adding circuit 336. The right eye chrominance signal CR is sent to the D/A converting circuit 34. The right eye luminance signal YR and the right eye chrominance signal CR which are analog signals obtained by conversion in the D/A converting circuit 34 are synthesized by a YC synchronizing circuit 35 to be a right eye image signal R.

A luminance signal outputted from the second parallax adjusting memory SM2 becomes a left eye luminance signal YL after a synchronizing signal is added thereto by the synchronizing signal adding circuit 336, and the left eye luminance signal YL is sent to a D/A converting circuit 36. Further, a color difference signal outputted from the fourth parallax adjusting memory SM4 is converted into a left eye chrominance signal CR by the encoder 337 after a synchronizing signal is added thereto by the synchronizing signal adding circuit 336. The left eye chrominance signal CR is sent to the D/A converting circuit 36. The left eye luminance signal YL and the right eye chrominance signal CL which are analog signals obtained by conversion in the D/A converting circuit 36 are synthesized by a YC synchronizing circuit 37 to be a left eye image signal L.

FIGS. 5 and 6 illustrate signals (data) in respective portions of the 2D/3D image converter shown in FIG. 4. FIGS. 5 and 6 illustrate only the luminance signal out of the luminance signal and the color difference signal.

Referring to FIGS. 5 and 6, description is made of operations performed by the 2D/3D image converter. The operations of the circuits for processing a luminance signal and the operations of the circuits for processing a color difference signal are the same except that a signal to be processed is a luminance signal or a color difference signal and hence, only the operations of the circuits for processing a luminance signal will be described herein.

As shown in FIG. 5, the luminance signal Y is successively written for each field into the field memories MO1 to MO3 and ME1 to ME3 in the order of MO1, ME1, M02, ME2, MO3 and ME3 by write pulses from the memory control circuit 332. After six fields, writing into all the field memories is completed. In this state, data in the first field to the sixth field are respectively written into the respective field memories MO1 to MO3 and ME1 to ME3 without being overlapped with each other.

Each of the field memories MO1 to MO3 and ME1 to ME3 holds the content of data until the write pulses are then inputted. If the write pulses are supplied to the field memory MO1 in the seventh field, the content of the data is reloaded with the content of data in the seventh field. The content of data in each of the field memories MO1 to MO3 and ME1 to ME3 is reloaded every six fields.

In the present embodiment, the six field memories are thus connected in parallel, and data is written into only one field memory for each field. Consequently, it is possible to significantly reduce consumed power, as compared with a method of connecting field memories in series and writing data into all the field memories for each field (data are successively sent between the field memories).

Control of reading from the field memories MO1 to MO3 and ME1 to ME3 is carried out in the following manner. Delay corresponding to a motion vector (the movement of an object) is determined by the CPU 8. The memory control circuit 332 selects a field memory in which data in a field corresponding to the delay determined by the CPU 8 is stored and outputs read pulses to the selected field memory.

If data in the current field is 03 and the delay is 2, for example, a shown in FIG. 5, read pulses are supplied to the field memory MO2 storing data 02 in a field which is two fields ahead of the current field, whereby the data 02 is read out of the field memory M02.

The operation of each of the selectors will be described in detail. The selector performs a selecting operation by a control signal from the CPU 8. In the present embodiment, there are a first normal mode, a second normal mode and an edit mode, which can be freely set. Operations performed in a case where the first normal mode is set will be described.

(1) First Normal Mode

If the first normal mode is set, the signals in the respective portions in the 2D/3D image converter 12 are as shown in FIG. 5.

If the first normal mode is set, there exist (a) fields where no interpolation processing is performed and (b) fields where infield interpolation processing is performed.

If one of a left eye image signal and a right eye image signal which are simultaneously supplied to the 3D monitor 13 is in an odd field and the other signal is in an even field, the shift in the vertical direction occurs between right and left images.

If a combination of a field including the luminance signal YO or YE (the delayed luminance signal) read out of the field memories MO1 to MO3 and ME1 to ME3 and a field including the luminance signal Y outputted from the clamping circuit 331 is a combination of an even field and an odd field, therefore, infield interpolation processing is performed in the vertical direction with respect to the delayed luminance signal. A signal obtained by the infield interpolation processing is used as a delayed luminance signal given to one eye.

If a combination of a field including the luminance signal YO or YE (the delayed luminance signal) read out of the field memories MO1 to MO3 and ME1 to ME3 and a field including the luminance signal Y outputted from the clamping circuit 331 is a combination of even fields or a combination of odd fields, the delayed luminance signal read out of the field memory is directly used as a delayed luminance signal given to one eye.

The first selector S1 always selects the luminance signal Y from the clamping circuit 331 and supplies the luminance signal Y in the current field which is not delayed to the sixth selector for a right eye S6 and the seventh selector for a left eye S7.

On the other hand, the second selector S2 selects any one of the luminance signals Y, YO and YE and outputs the selected luminance signal depending on the delay and whether a field corresponding to the delay is even or odd. That is, in a case where the delay is zero, the luminance signal Y is selected. In a case where the delay is other than zero, the luminance signal YO is selected if the field corresponding to the delay is odd, while the luminance signal YE is selected if the field corresponding to the delay is even.

The fifth selector S5 always selects the line memory LM1. Consequently, the luminance signal Y, YO or YE outputted from the second selector S2 and a signal obtained by delaying the luminance signal for one horizontal scanning period are inputted to the interpolation circuit 334.

An interpolation coefficient of the interpolation circuit 334 is set by the CPU 8. If both the luminance signal Y outputted from the first selector S1 and the luminance signal YO or YE outputted from the second selector S2 are in odd fields or even fields, the interpolation coefficient K is 1, so that no infield interpolation processing is performed. That is, if the delay is zero or even, no infield interpolation processing is performed. In this case, therefore, the luminance signal Y, YO or YE outputted from the second selector S2 is outputted from the interpolation circuit 334.

If one of the field including the luminance signal Y outputted from the first selector S1 and the field including the luminance signal YO or YE outputted from the second selector S2 is even and the other field is odd, the interpolation coefficient K is 0.5, so that infield interpolation processing is performed. That is, if the delay is odd, infield interpolation processing is performed. In this case, therefore, a signal obtained by infield interpolation of the delayed luminance signal YO or YE outputted from the second selector S2 is outputted from the interpolation circuit 334.

The luminance signal outputted from the interpolation circuit 334 and the luminance signal Y outputted from the first selector S1 are supplied to both the sixth selector S6 and the seventh selector S7. Both the selectors S6 and S7 constitute the image switching circuit 2 shown in FIG. 3 for sending one of the output Y of the first selector S1 and the output Y, YO or YE of the interpolation circuit 334 to the parallax adjusting memory for a right eye SM1 and sending the other output to the parallax adjusting memory for a left eye SM2 depending on the direction of the motion vector. The parallax is adjusted by the parallax adjusting memories SM1 and SM2.

(2) Second Normal Mode

Description is now made of the operation of each of the selectors in a case where the second normal mode is set. Signals in the respective portions in the 2D/3D image converter 12 in this case are as shown in FIG. 6.

If the second normal mode is set, there exist (a) fields where no interpolation processing is performed, (b) fields where infield interpolation processing is performed, (c) fields where interfield interpolation processing is performed.

When the delay is changed, the movement of a delayed image is not smoother, as compared with that of an image in the current field. In the second normal mode, therefore, a delayed image corresponding to the delay is subjected to interfield interpolation processing in a field where the delay has bee just changed, thereby to smooth the movement.

In a field where the delay is not changed, the same operation as that in a case where the first normal mode is set is performed.

In the second normal mode, when the delay is changed from n to (n+1), an image in a field corresponding to the delay n and an image in a field corresponding to the delay (n+1) are respectively read out of the corresponding field memories. In FIG. 6, the delay is changed from 1 to 2 when data in the current field becomes 03, whereby data E2 in a field which is one field ahead of the current field and data 02 in a field which is two fields ahead of the current field are read out of the field memories.

When the delay is changed from n to (n−1), the image in a field corresponding to the delay n and an image in a field corresponding to the delay (n−1) are respectively read out of the corresponding field memories. In FIG. 6, the delay is changed from 3 to 2 when data in the current field becomes 08, whereby data E6 in a field which is three fields ahead of the current field and data 07 in a field which is two fields ahead of the current field are read out of the field memories.

The first selector S1 always selects the luminance signal Y from the clamping circuit 331, and supplies the luminance signal Y in the current field which is not delayed to the sixth selector for a left eye S6 and the seventh selector for a right eye S7.

On the other hand, the second selector S2 selects any one of the luminance signals Y, YO and YE and outputs the selected luminance signal, as shown in FIG. 6. That is, in a field where the delay is changed from 0 to 1, the luminance signal Y is selected. In fields other than the field where the delay is changed from 0 to 1, the luminance signal Y is selected if the delay is zero, as in the first normal mode. On the other hand, if the delay is other than zero, the luminance signal YO is selected if a field corresponding to the delay is odd, while the luminance signal YE is selected if a field corresponding to the delay is even.

In a field where interfield interpolation processing is performed, that is, a field where the delay is changed, the fifth selector S5 selects the luminance signal YO or YE and outputs the selected luminance signal by the following rule. Specifically, in the field where the delay is changed from 0 to 1, the luminance signal YO is selected if a field one field ahead of the field is odd, while the luminance signal YE is selected if a field one field ahead of the field is even.

In a field where the change of the delay is other than the change from 0 to 1, the luminance signal YO is selected if a field corresponding to the delay before the change is odd on the basis of the current field. On the other hand, the luminance signal YE is selected if a field corresponding to the delay is even on the basis of the current field.

If one of the field including the luminance signal Y outputted from the first selector S1 and the field including the delayed luminance signal YO or YE outputted from the second selector S2 which are fields other than the field where interfield interpolation processing is performed is odd and the other field is even, an output of the line memory LM1 is selected by the fifth selector S5.

An interpolation coefficient K of the interpolation circuit 334 is set to 0.5 so as to perform interfield interpolation processing in a field where the delay has been just changed. In this case, data in a field corresponding to the delay in the current field and a field one field ahead of the current field are supplied to the interpolation circuit 334. In FIG. 6, if the current field is 03, data 02 and E2 are supplied to the interpolation circuit 334. In the interpolation circuit 334, the arithmetical mean of the data in the two adjacent fields is found, thereby to smooth the movement of images.

If one of the field including the luminance signal Y outputted from the first selector S1 and the field including the delayed luminance signal YO or YE outputted from the second selector S2 is odd and the other field is even out of fields other than fields where interfield interpolation processing is performed, the interpolation coefficient K is set to 0.5 so as to perform infield interpolation processing.

In the other fields, the interpolation coefficient K is set to 1, so that neither of the interfield interpolation processing and the infield interpolation processing is performed.

In the example shown in FIG. 6, interfield interpolation processing is performed when the luminance signal Y in the current field is 02, 03, 04, 05, 07, 08 and 09. On the other hand, infield interpolation processing is performed when the luminance signal Y in the current field is E2, E4, E7 and E9.

The operations of the sixth selector S6 and the seventh selector S7 in the second normal mode are the same as those in the first normal mode.

(3) Edit mode

The edit mode will be described.

In the above described two normal modes, the present luminance signal and the delayed luminance signal are irregularly replaced in a complementary manner depending on the direction of the motion vector in the outputs of the sixth selector for a right eye S6 and the seventh selector for a left eye S7. Consequently, the delayed luminance signal may be outputted as a left eye image signal or a right eye image signal depending on cases.

Furthermore, as apparent from comparison between the luminance signal which is not delayed and the delayed luminance signal (for example, the luminance signal Y in the current field and the output of the interpolation circuit 334 shown in FIG. 5), the field order in the delayed luminance signal is not the same as that in the luminance signal which is not delayed. Particularly in the process of decreasing the delay, some fields are thinned.

Even if either one of the left eye image signal and the right eye image signal is selected, therefore, the luminance signal which is not delayed and the delayed luminance signal are present as a mixture. Therefore, it is not preferable that editing is performed using the selected image signal. Specifically, at the time of editing, the field order must coincide with the field order in the original image in at least one of the left eye image signal and the right eye image signal.

If the LSI 33 in the present embodiment is operated in the edit mode, an external selector must be provided between the output terminals of the field memories and the input terminal of the LSI 33 to which outputs of the field memories are inputted. Further, it is desirable that the number of field memories is increased to approximately 13.

In this edit mode, the sixth selector for a right eye S6 is so set that the output of the first selector S1 is always supplied to the parallax adjusting memory for a right eye SM1. Consequently, the output of the first selector S1 is so selected as to be always an output for a right eye. Further, the seventh selector for a left eye S7 is so set that an output of the interpolation circuit 334 is always supplied to the parallax adjusting memory for a left eye SM2. Consequently, the output of the interpolation circuit 334 is so set as to be always an output for a left eye.

Furthermore, the first selector S1 is so set as to always select the third input terminal, while the second selector S2 is so set as to always select the second input terminal. The above described external selector selects data (a memory output) in a field where the delay is constant on the basis of the current field with respect to the first selector S1 and supplies the selected data into the third input terminal of the first selector S1. Further, the above described external selector selects data (a memory output) in a field corresponding to the delay which varies depending on the motion vector on the basis of data in a field where the delay is constant which is supplied to the first selector S1 and supplies the selected data to the second input terminal of the second selector S2.

Consequently, it is possible to always obtain a signal which is identical in the field order to the original image in one of output terminals at the time of editing.

Although the 2D/3D image converter according to the above described embodiment produces two signals between which there is a time difference from a 2D image signal as a method of producing parallax between a left eye image and a right eye image, two signals between which there is a luminance difference may be produced to view 3D images by a Pulfrich effect.

Figure 7:
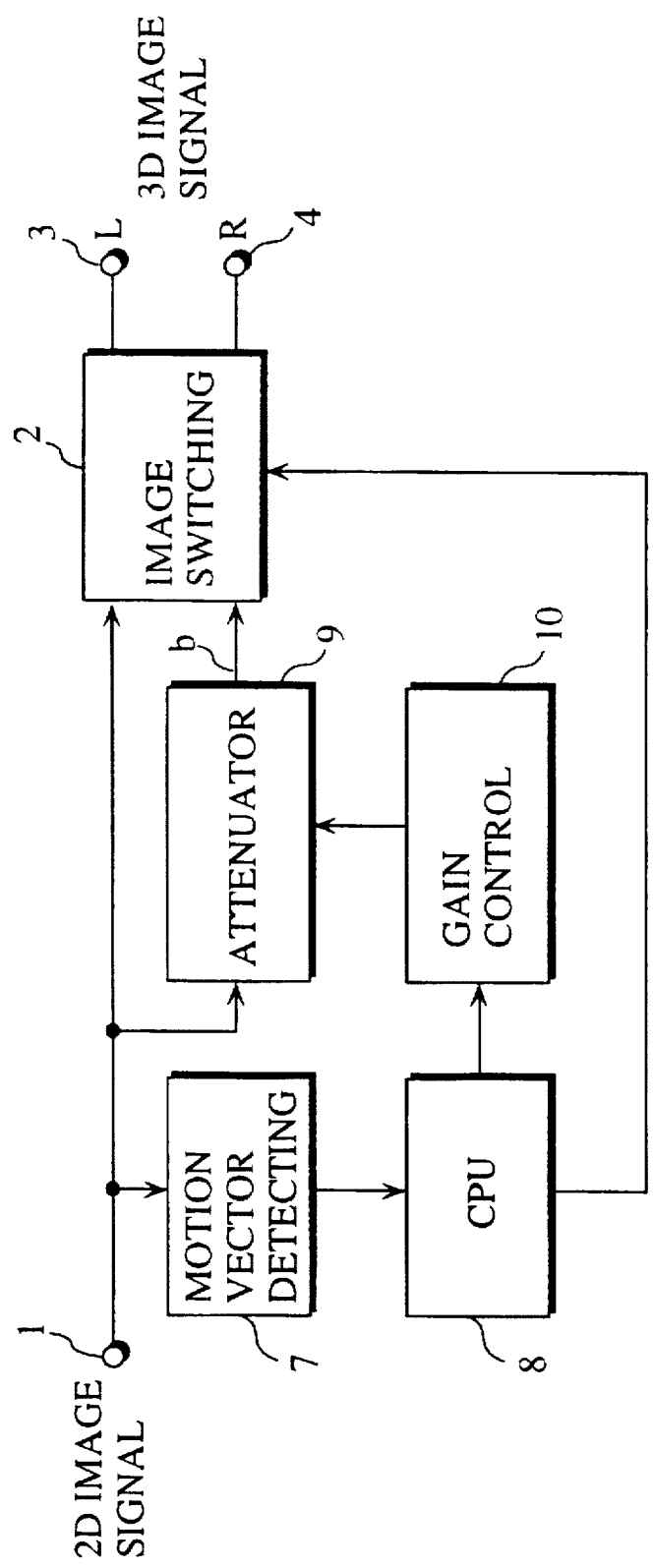
FIG. 7 is a block diagram showing another example of the 2D/3D image converter.

FIG. 7 illustrates an embodiment of a 2D/3D image converter for producing two signals between which there is a luminance difference. In FIG. 7, the same portions as those shown in FIG. 3 are assigned the same reference numerals and hence, the description thereof is not repeated.

In this 2D/3D image converter, an attenuator 9 which attenuates the luminance level between 0 db and −10 db and a gain control circuit 10 are used in place of the group of field memories 5 and the memory control circuit 6 shown in FIG. 3.

The attenuator 9 and the gain control circuit 10 are controlled on the basis of the magnitude of the motion vector, as in the 2D/3D image converter shown in FIG. 3. Specifically, if the movement of the object is large and the motion vector is large, such control is carried out that the amount of attenuation of the luminance of the attenuator 9 is decreased. If the motion of the object is small or the motion vector is small as at the time of slow-motion reproduction, such control is carried out that the amount of attenuation of the luminance is increased.

The amount of attenuation of the attenuator 9 is not limited to 0 to −10 db. In a case where it is used for lower-speed slow-motion reproduction, an amount of attenuation of several 10 db may be applied. In addition, a variable gain amplifier may be used in place of the attenuator.

Furthermore, the present invention is applicable to not only a case where the existing 2D image software is converted into 3D image software as in the above described embodiment but also a case where a 2D image signal outputted in real time from a video camera, a CG producing device or the like is converted into a 3D image signal in real time.

Figure 8:
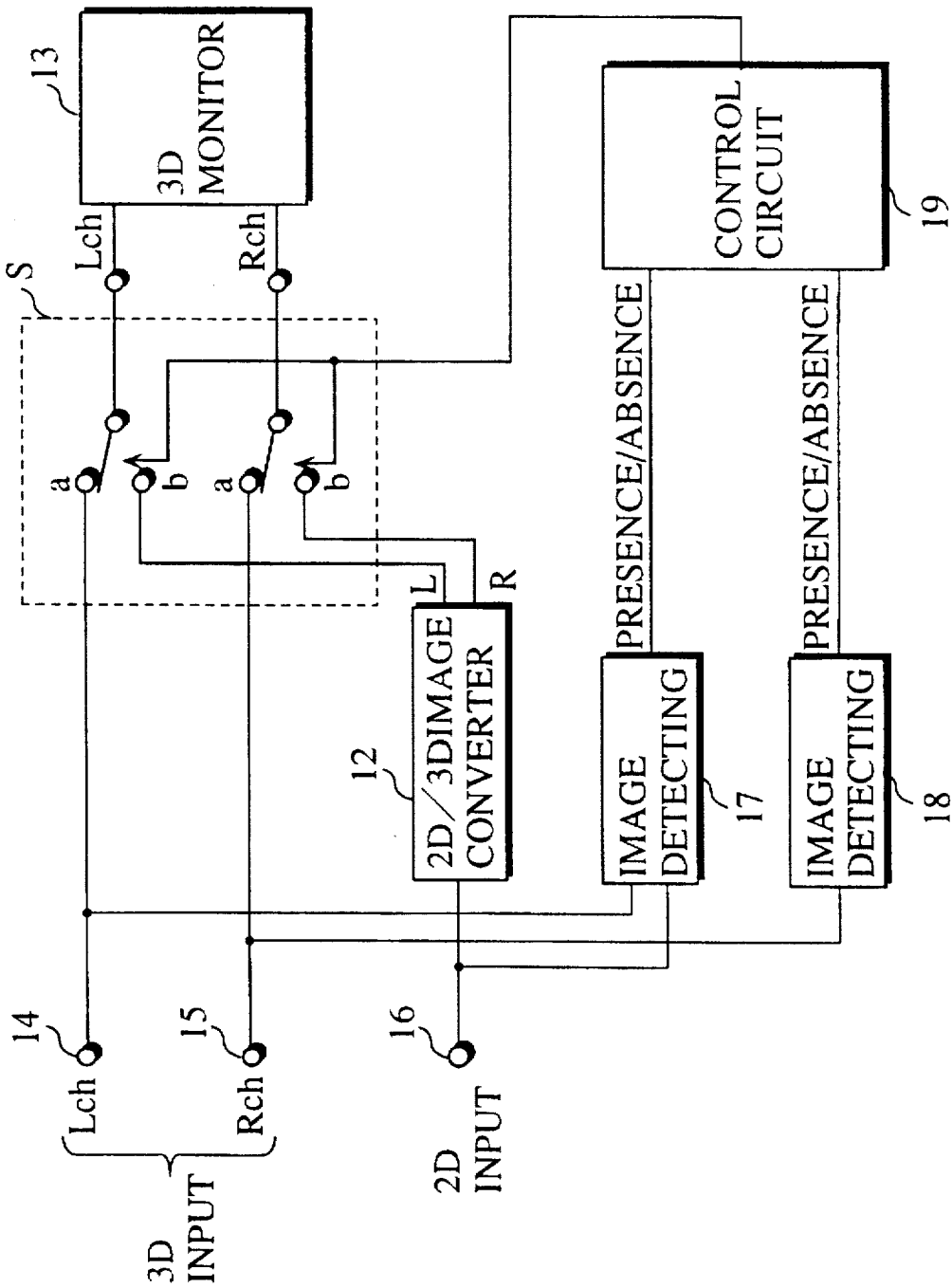
FIG. 8 is a block diagram showing another example of the 2D/3D image conversion system.

FIG. 8 illustrates another example of the 2D/3D image conversion system.

The 2D/3D image conversion system is of construction which can correspond to both cases where an input signal is a 2D image signal and a 3D image signal.

There are provided 3D input terminals 14 and 15 to which 3D image signals are respectively inputted and a 2D input terminal 16 to which a 2D image signal is inputted. Either one of the 2D image signal and the 3D image signal is inputted.

The conversion switch S is automatically switched depending on the type of the input signal. The 3D image signals inputted from the 3D input terminals 14 and 15 are respectively inputted to a first image detecting circuit 17. In the first image detecting circuit 17, the presence or absence of each of the 3D image signals is detected, after which a logical AND of the results of the detection is supplied to a control circuit 19.

The 2D image signal inputted from the 2D input terminal 16 is inputted to a second image detecting circuit 18. In the second image detecting circuit 18, the presence or absence of the image signal is detected, after which the result of the detection is supplied to the control circuit 19.

The control circuit 19 switches the conversion switch S into its a side when the output of the first image detecting circuit 17 is "presence" and the output of the second image detecting circuit 18 is "absence". On the other hand, the control circuit 19 switches the conversion switch S into its b side when the output of the first image detecting circuit 17 is "absence" and the output of the second image detecting circuit 18 is "presence".

Specifically, in the 2D/3D image conversion system, it is automatically judged which of the 2D image signal and the 3D image signal is inputted. When the 3D image signal is inputted, the 3D image signal is supplied to a 3D monitor 13 through the conversion switch S. On the other hand, when the 2D image signal is inputted, the 2D image signal is converted into a 3D image signal by a 2D/3D image converter 12, and the obtained 3D image signal is supplied to the 3D monitor 13 through the conversion switch S.

The 2D/3D image converter 12 and the conversion switch S may be contained in the 3D monitor 13.

Figure 9:
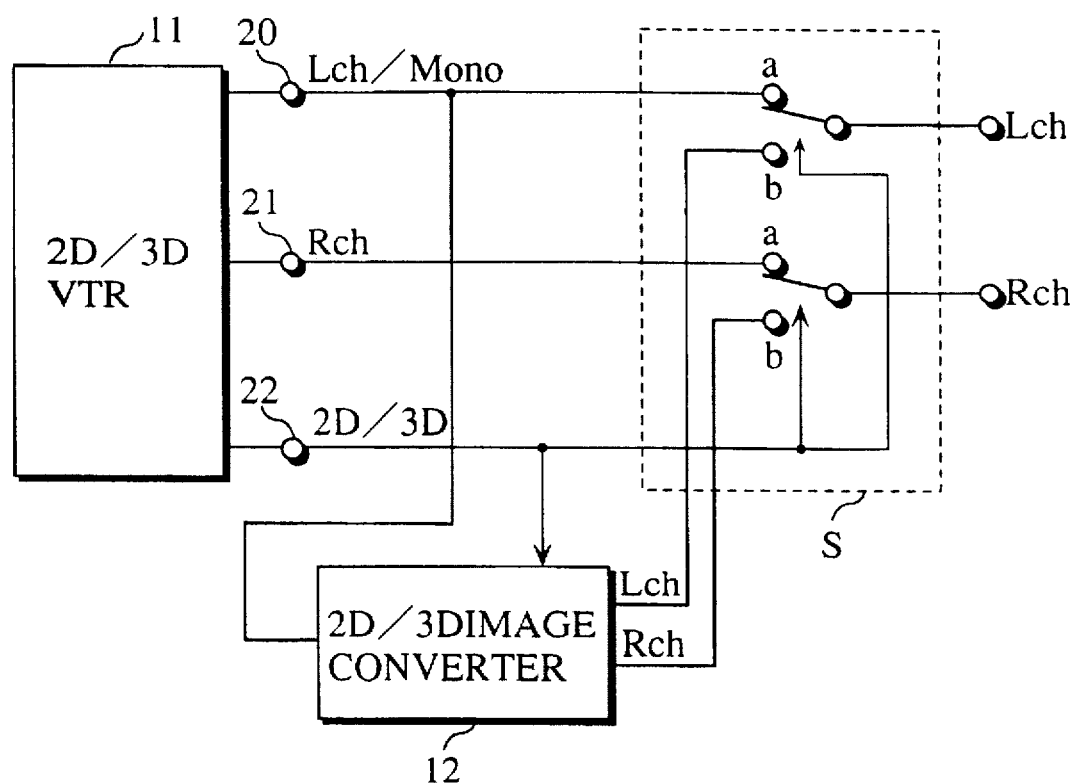
FIG. 9 is a block diagram showing still another example of the 2D/3D image conversion system.

FIG. 9 illustrates still another example of the 2D/3D image conversion system.

A 2D/3D compatible VTR 11 is provided with output terminals 20, 21 and 22. At the time of the 3D mode, a signal on an L channel is outputted to the output terminal 20, while a signal on an R channel is outputted to the output terminal 21. At the time of the 2D mode, a 2D image signal is outputted to the output terminal 20.

Furthermore, a discriminating signal at an "H" level and a discriminating signal at an "L" level are respectively outputted to the output terminal 22 at the time of the 3D mode and the 2D mode. The discriminating signal is produced depending on the set mode by a system controller (not shown) in the 2D/3D compatible VTR 11, and is supplied to a 2D/3D image converter 12 and a conversion switch S.

The output terminal 20 of the 2D/3D compatible VTR 11 is connected to an input terminal of the 2D/3D image converter 12.

At the time of the 3D mode, the conversion switch S is switched into its a side by the discriminating signal at an "H" level. Consequently, the signals on the L channel and the R channel from the output terminals 20 and 21 of the 2D/3D compatible VTR 11 are outputted through the conversion switch S.

At the time of the 2D mode, the power is supplied to the 2D/3D image converter 12 and the conversion switch S is switched into its b side by the discriminating signal at an "L" level. In this case, the 2D image signal from the output terminal 20 of the 2D/3D compatible VTR 11 is converted into the 3D image signal by the 2D/3D image converter 12, and the obtained 3D image signal is outputted through the conversion switch S.

The 2D/3D image converter 12 and the conversion switch S may be contained in the 2D/3D compatible VTR 11.

Figure 10:
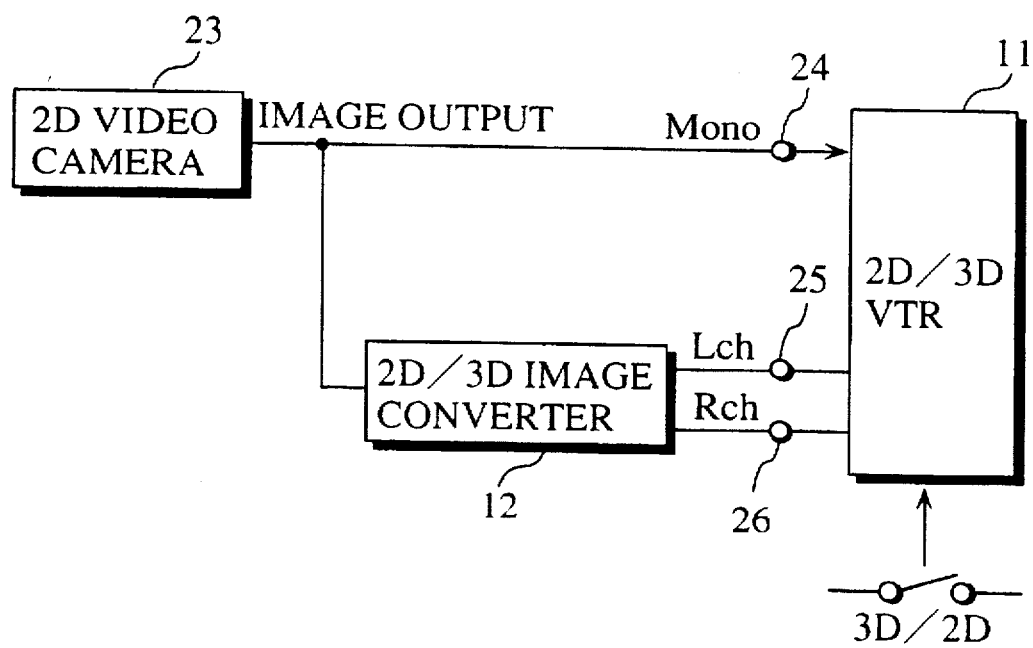
FIG. 10 is a block diagram showing a further example of the 2D/3D image conversion system.

FIG. 10 illustrates a further example of the 2D/3D image conversion system.

At the time of the 2D mode, an output of a 2D video camera 23 is directly supplied to a 2D input terminal 24 of the 2D/3D compatible VTR 11. On the other hand, at the time of the 3D mode, the output of the 2D video camera 23 is converted into a 3D image signal by a 2D/3D image converter 12, and signals on two channels obtained by the conversion are respectively supplied to an input terminal 25 and an input terminal 26.

At the time of the 2D mode, the 2D/3D compatible VTR 11 records the signal inputted from the input terminal 24 on a record medium. On the other hand, at the time of the 3D mode, the signals on the two channels inputted from the input terminals 25 and 26 are respectively recorded on the record medium.

The 2D/3D image converter 12 may be contained in the 2D video camera 23.

FIG. 11 illustrates a still further example of the 2D/3D image conversion system.

A 2D image reproducing device 101 includes an ordinary video tape recorder, video disk player or the like. A TV broadcasting receiver 102 includes a television tuner, a CATV (Cable Television) tuner or the like for receiving a 2D television signal transmitted through an antenna or a cable.

A 2D image signal 104 selected by a switch 103 which is switched by a user out of a 2D image signal reproduced by the 2D image reproducing device 101 and a 2D image signal received and demodulated by the TV broadcasting receiver 102 is supplied to a 2D/3D image converter 12.

In the 2D/3D image converter 12, the inputted 2D image signal is converted into a 3D image signal comprising a right eye image signal R and a left eye image signal L between which parallax is provided, as already described. The right eye image signal R and the left eye image signal L which are outputted from the 2D/3D image converter 12 are supplied to a simultaneous/sequential signal converter 105.

The simultaneous/sequential signal converter 105 alternately switches for each predetermined time period the right eye image signal R and the left eye image signal L which are inputted in parallel and simultaneously and serially outputs the signal obtained by the switching. The right eye image signal R and the left eye image signal L which are sequenced by the converter 105 are supplied to an image display.

Examples of the image display include an ordinary television receiver 106 using a picture tube, a projector 107, and a small-sized liquid crystal television 108.

The operation of the simultaneous/sequential signal converter 105 will be described in more detail.

Figure 12A:
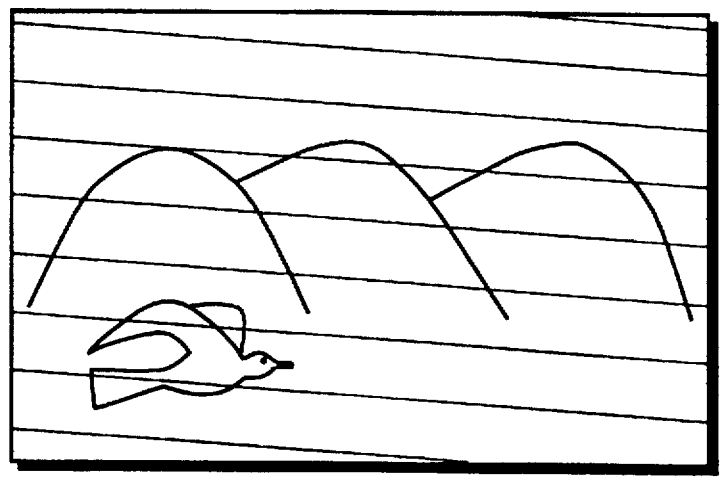
FIGS. 12a and 12b are schematic views showing a right eye image R and a left eye image L.
Figure 12B:
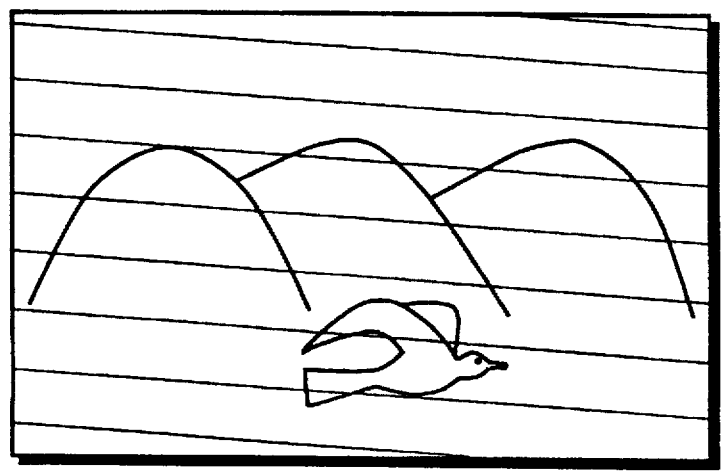

If both the right eye image signal R and the left eye image signal L which are inputted are of an interlace type of 2:1, only the right eye image signal R is outputted at timing at which data in an odd field is outputted from the converter 105, while only the left eye image signal L is outputted at timing at which data in an even field is outputted from the converter 105, as shown in FIGS. 12a and 12b. Consequently, the right eye image signal R and the left eye image signal L are alternately inputted for each field to the image display such as the television receiver.

Furthermore, even when both the right eye image signal R and the left eye image signal L is of an interlace type of 2:1, the signal converter 105 may alternately output the right eye image signal R and the left eye image signal L for each frame (for two fields). In this case, the right eye image signal R comprising odd and even fields and the left eye image signal L comprising odd and even fields are alternately supplied for each frame to the image display such as the television receiver.

If both the right eye image signal R and the left eye image signal L is of a non-interlace type, the right eye image signal R and the left eye image signal L are supplied for each frame to the image display.

Whether both the right eye image signal R and the left eye image signal L which are inputted are of an interlace type of 2:1 or a non-interlace type, the right eye image signal R and the left eye image signal L may be alternately supplied to the image display for a plurality of fields or frames.

If 3D images from the image display such as the television receiver are viewed, 3D image viewing glasses 109 are used. A right eye portion and a left eye portion of the glasses 109 are so switched that one of the portions enters a light transmitted state and the other portion enters a light intercepted state. This switching may be performed in synchronism with switching between the right eye image signal R and the left eye image signal L.

Specifically, when the image display displays or projects the right eye image signal R, the right eye portion and the left eye portion of the glasses 109 are respectively brought into the light transmitted state and the light intercepted state. On the contrary, when the left eye image signal L is displayed or projected, the left eye portion and the right eye portion of the glasses 109 are respectively brought into the light transmitted state and the light intercepted state.

The glasses 109 are produced by a light polarizing plate and a liquid crystal panel so as to electrically switch the light transmitted state. However, the light transmitted state may be mechanically switched by a shutter mechanism without using the light polarizing plate and the liquid crystal panel. Further, the right and left eye portions of the glasses 109 are switched by a switching signal which is applied through a cable 110 or radio waves from the simultaneous/sequential signal converter 105.

If the projector 107 is used as an image display, the right eye image signal R and the left eye image signal L from the projector 107 are projected on a screen 111. In this case, a viewer views an image projected on the screen 111 with the 3D image viewing glasses 109 on.

3D images can be viewed by directly supplying the right eye image signal R and the left eye image signal L from the 2D/3D image converter 12 to a so-called 3D display without glasses using no 3D image viewing glasses, as already described in the embodiment shown in FIG. 2.

The 3D display without glasses can be realized by a combination of a liquid crystal display (or a liquid crystal projector) for interleaving the right eye image signal R and the left eye image signal L for each pixel and projecting the interleaved signals and a lenticular lens sheet or a parallax barrier sheet disposed on its display screen (or the front surface of its projection screen).

All scenes obtained from the image reproducing device 101 or the TV broadcasting receiver 102 may be converted into 3D images. Alternately, only a scene suitable for a 3D image such as a scene where an object moves in a predetermined direction may be converted into a 3D image.

If a particular scene is converted into a 3D image, the particular scene is automatically detected from a 2D image signal, and the detected scene is converted into a 3D image. If the 2D image signal is produced by television broadcasting or the like, it is preferable that the particular scene is automatically detected in the following manner.

Figure 13:
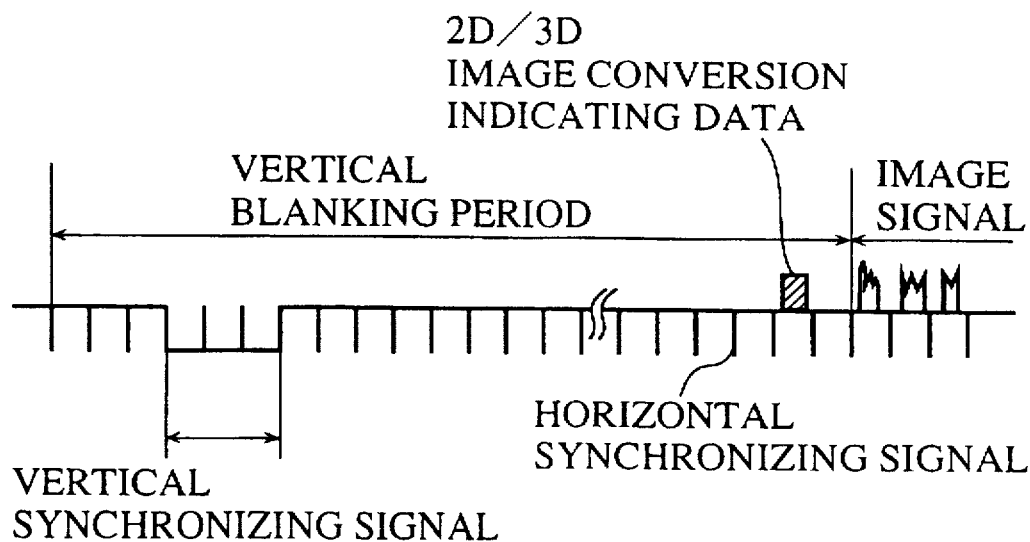
FIG. 13 is a timing chart showing the position in which 2D/3D image conversion indicating data is inserted.

Specifically, as shown in FIG. 13, in a suitable period in a vertical blanking period immediately before a television image signal in the above described particular scene, data indicating that the scene is to be subjected to 2D/3D image conversion (2D/3D image conversion indicating data) is previously inserted on the side of a television broadcasting station and a CATV relay center and sent out. When the 2D/3D image conversion indicating data is detected by the 2D/3D image converter 12 shown in FIG. 11, the above described particular scene thereafter appearing is automatically converted into a 3D image.

Figure 14:
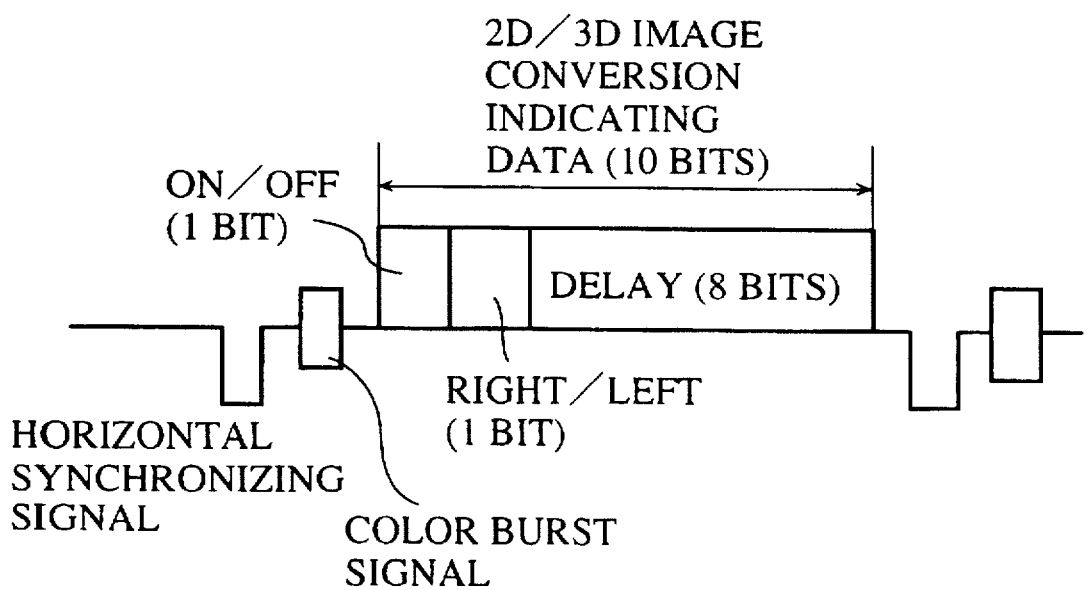
FIG. 14 is a schematic view showing the format of the 2D/3D image conversion indicating data.

The 2D/3D image conversion indicating data is constituted by data (on/off) indicating whether or not 2D/3D image conversion is performed with respect to the particular scene, data (left/right) indicating the direction of the movement of the object in the particular scene, and data indicating the delay, for example, as shown in FIG. 14.

Although in FIG. 11, only the image reproducing device 101 and the TV broadcasting receiver 102 are illustrated as 2D image sources, an ordinary video camera or a 2D CG producing device may be used in addition thereto, provided that it outputs a 2D image signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images comprising:

producing from a two-dimensional image signal a first image signal and a second image signal which is delayed from the first image signal;

assigning said first and second image signals to a respective left or right eye image;

wherein an image represented by said two-dimensional imaged signal includes a moving portion;

wherein delay is indicated by how many fields there are from a field corresponding to the first image signal to a field corresponding to the second image signal as relating to the speed of the movement in said moving portion wherein the speed is determined based on a horizontal component of a motion vector which is detected from the first image signal; and wherein the higher the speed of the movement in said moving portion is, the smaller said delay is, while the lower the speed of the movement in the moving portion is, the larger the delay is.

2. The method according to claim 1, wherein
said two-dimensional image signal is obtained by reproducing two-dimensional image software stored in a record medium by image reproducing means.

3. The method according to claim 1, wherein
said two-dimensional image signal is outputted in real time from imaging means.

4. The method according to claim 1, wherein
two-dimensional image software is outputted in real time from computer graphics producing means.

5. The method according to claim 1, wherein
said second image signal is obtained by storing said two-dimensional image signal in a memory once and reading out from the two-dimensional image signal stored in the memory a two-dimensional image signal corresponding to the delay determined on the basis of the speed of the movement in said moving portion.

6. The method according to claim 1, wherein
it is determined on the basis of the direction of the movement in said moving portion which of said first image signal and said second image signal is taken as each of said left eye image signal and said right eye image signal.

7. The method according to claim 6, wherein
said first image signal is taken as the left eye image signal and said second image signal is taken as the right eye image signal if the direction of the movement in said moving portion is a direction from the left to the right, while the first image signal is taken as the right eye image signal and the second image signal is taken as the left eye image signal if the direction of the movement in the moving portion is a direction from the right to the left.

8. The method according to claim 1, wherein
either one of the first image signal and the second image signal is subjected to infield interpolation processing when the first image signal and the second image signal corresponding thereto differ in the type of field.

9. The method according to claim 1, wherein
said second image signal is subjected to interfield interpolation processing in a field where the delay has been just changed.

10. A method of converting two-dimensional images into three-dimensional images comprising:
producing from a two-dimensional image signal a first image signal and a second image signal a luminance of which is attenuated from the first image signal and taking one of the signals as a left eye image signal and the other signal as a right eye image signal;
an image represented by said two-dimensional image signal includes a moving portion,
an amount of attenuation of the luminance of the second image signal from the first image signal being determined on the basis of the speed of the movement in the moving portion wherein the speed is determined based on a horizontal component of a motion vector which is detected from the first image signal,
the higher the speed of the movement in said moving portion is, the smaller said amount of attenuation of the luminance is, while the lower the speed of movement in the moving portion is, the large the amount of attenuation of luminance is.

11. The method according to claim 10, wherein
said second image signal is obtained by attenuating the luminance of said two-dimensional image signal by variable luminance adjusting means depending on the amount of attenuation of the luminance determined on the basis of the speed of the movement in the moving portion.

12. A 3D image display system comprising:
a 2D/3D image converter for converting two-dimensional images into three-dimensional images by producing from a two-dimensional image signal a right eye image signal and a left eye image signal between which there is a relative time difference; and wherein an image represented by said two-dimensional image signal includes a moving portion;
wherein delay is indicated by how many fields there are from a field corresponding to the first image signal to a field corresponding to the second image signal as relating to the speed of the movement in said moving portion wherein the speed is determined based on a horizontal component of a motion vector which is detected from the first image signal;
wherein the higher the speed of the movement in said moving portion is, the smaller said delay is, while the lower the speed of the movement in the moving portion is, the larger the delay is; and
a display for realizing three-dimensional images on the basis of the right eye image signal and the left eye image signal which are obtained by the 2D/3D image converter.

13. The 3D image display system according to claim 12, wherein
said display comprises a three-dimensional image display monitor for simultaneously displaying said right eye image signal and said left eye image signal which are obtained by said 2D/3D image converter.

14. The 3D image display system according to claim 12, wherein
said display comprises
a two-dimensional image display monitor for alternately switching said right eye image signal and said left eye image signal which are obtained by said 2D/3D image converter for predetermined number of fields or frames and displaying the signal obtained by the switching, and
three-dimensional image viewing glasses having a left eye portion and a right eye portion which can be so switched that one of the portions enters a light transmitted state and the other portion enters a light intercepted state,
the left eye portion and the right eye portion of said three-dimensional image viewing glasses being so switched that one, which corresponds to an image displayed on said monitor, of the left eye portion and the right eye portion enters the light transmitted state in synchronism with the switching between said right eye image signal and said left eye image signal.

15. The 3D image display system according to claim 12, wherein
said display comprises
a two-dimensional image display projector for alternately switching said right eye image signal and said left eye image signal obtained by said 2D/3D image converter for predetermined number of fields or frames and projecting the signal obtained by the switching, and
three-dimensional image viewing glasses having a left eye portion and a right eye portion which can be so switched that one of the portions enters a light transmitted state and the other portion enters a light intercepted state, the left eye portion and the right eye portion of said three-dimensional image viewing glasses being so switched that one, which corresponds to an image projected by said projector, of the left eye portion and the right eye portion enters the light transmitted state in synchronism with the switching between said right eye image signal and said left eye image signal.

16. A 3D image display system comprising:

a 2D/3D image converter for converting two-dimensional images into three-dimensional images by producing from a two-dimensional image signal a right eye image signal and a left eye image signal between which there is relatively a luminance difference based upon a amount of attenuation of luminance is determined based upon a horizontal component of a motion vector corresponding to movement of a moving portion detected from a first image signal; and a display for realizing three-dimensional images on the basis of the right eye image signal and the left eye image signal which are obtained by the 2D/3D image converter.

17. The 3D image display system according to claim 16, wherein said display comprises a three-dimensional image display monitor for simultaneously displaying said right eye image signal and said left eye image signal which are obtained by said 2D/3D image converter.

18. The 3D image display system according to claim 16, wherein said display comprises a two-dimensional image display monitor for alternately switching said right eye image signal and said left eye image signal which are obtained by said 2D/3D image converter for each predetermined number of fields or frames and displaying the signal obtained by the switching, and three-dimensional image viewing glasses having a left eye portion and a right eye portion which can be so switched that one of the portions enters a light transmitted state and the other portion enters a light intercepted state, the left eye portion and the right eye portion of said three-dimensional image viewing glasses being so switched that one, which corresponds to an image displayed on said monitor, of the left eye portion and the right eye portion enters the light transmitted state in synchronism with the switching between said right eye image signal and said left eye image signal.

19. The 3D image display system according to claim 16, wherein said display comprises a two-dimensional image display projector for alternately switching said right eye image signal and said left eye image signal which are obtained by said 2D/3D image converter for each predetermined number of fields or frames and projecting the signal obtained by the switching, and three-dimensional image viewing glasses having a left eye portion and a right eye portion which can be so switched that one of the portions enters a light transmitted state and the other portion enters a light intercepted state, the left eye portion and the right eye portion of said three-dimensional image viewing glasses being so switched that one, which corresponds to an image projected by said projector, of the left eye portion and the right eye portion enters the light transmitted state in synchronism with the switching between said right eye image signal and said left eye image signal.

* * * * *

UNITED STATES PATENT AND TRADEMARK OFFICE
CERTIFICATE OF CORRECTION

PATENT NO. : 5,717,415

DATED : February 10, 1998

INVENTOR(S) : Iue et al.

It is certified that error appears in the above-identified patent and that said Letters Patent is hereby corrected as shown below:

Title page,

Item [30], line 1, delete "Feb. 10, 1994" insert therefor -- Feb. 1, 1994 --.

Item [30], line 2, delete "6-018582" insert therefor -- 6-019582 --.

Item [30], line 4, delete "Feb. 24, 1996" insert therefor -- Feb. 24, 1994 --.

Signed and Sealed this

Second Day of June, 1998

Attest:

BRUCE LEHMAN

*Attesting Officer*     *Commissioner of Patents and Trademarks*